United States Patent [19]

Yoshida et al.

[11] Patent Number: 4,528,958

[45] Date of Patent: Jul. 16, 1985

[54] INTAKE CONTROL SYSTEM OF ENGINE

[76] Inventors: Takumori Yoshida, 2822 Nishikaizuka, Iwata-shi, Shizuoka-ken; Akira Yamada, 1310-5 Tokosuka, Osuka-cho, Ogasa-gun, Shizuoka-ken; Sadayuki Shinmura, 1309 Nishikaizuka, Iwata-shi, Shizuoka-ken, all of Japan

[21] Appl. No.: 356,812

[22] Filed: Mar. 10, 1982

[30] Foreign Application Priority Data

Jul. 10, 1981 [JP] Japan ................................ 56-107664

[51] Int. Cl.³ .............................................. F02M 9/12
[52] U.S. Cl. .................................... 123/442; 123/308; 123/432; 123/52 M
[58] Field of Search .......... 123/442, 308, 432, 188 M, 123/52 M

[56] References Cited

U.S. PATENT DOCUMENTS

| | | | |
|---|---|---|---|
| 2,473,808 | 6/1949 | Mallory | 123/122 |
| 3,408,992 | 11/1968 | Seggern et al. | 123/75 |
| 3,721,428 | 3/1973 | Gelé et al. | 123/442 |
| 4,002,704 | 1/1977 | Laprade et al. | 261/23 A |
| 4,086,885 | 5/1978 | Noguchi et al. | 123/32 ST |
| 4,181,105 | 1/1980 | Takemoto et al. | 123/308 |
| 4,246,874 | 1/1981 | Nakagawa et al. | 123/308 |
| 4,276,862 | 7/1981 | Matsumoto | 123/308 |
| 4,300,504 | 11/1981 | Tezuka | 123/442 |
| 4,317,438 | 3/1982 | Yagi et al. | 123/308 |
| 4,323,038 | 4/1982 | Motosugi et al. | 123/442 |
| 4,323,041 | 4/1982 | Endo et al. | 123/308 |

FOREIGN PATENT DOCUMENTS

| | | | |
|---|---|---|---|
| 2617728 | 5/1977 | Fed. Rep. of Germany | 177/261 |
| 160156 | 12/1980 | Japan | 123/445 |

Primary Examiner—Craig R. Feinberg
Assistant Examiner—David A. Okonsky
Attorney, Agent, or Firm—Ernest A. Beutler

[57] ABSTRACT

An embodiment of induction system for internal combustion engines that permit maximum power output while at the same time insuring good running at low speeds without loss in mid-range torque. Independent intake passages communicate with each chamber of the engine. A throttle valve arrangement is included that includes a first manually operated throttle valve positioned in a common portion of the intake passages, a second manually operated throttle valve that is positioned in the first intake passage between the first throttle valve and the chamber, and a third throttle valve positioned in the second intake passage between the first throttle valve and the chamber. A linkage system interconnects the first and second throttle valves so that the second throttle valve is opened at a predetermined degree of opening of the first throttle valve. The linkage causes the second throttle valve to be moved to its fully opened positioned before the first throttle valve is fully opened. The third throttle valve is automatically positioned in response either to atmospheric pressure to hold the third throttle valve in one position or induction system pressure to hold the third throttle valve in its other position.

20 Claims, 3 Drawing Figures

INTAKE CONTROL SYSTEM OF ENGINE

BACKGROUND OF THE INVENTION

This invention relates to an intake control system for engines and more particularly to an improved induction system for internal combustion engines.

It has been proposed to increase the power output of an internal combustion engine by providing multiple intake passages, each serving the same chamber of the engine. By virtue of the use of such multiple intake passages the volumetric efficiency at wide open throttle may be improved, and, accordingly, maximum power output can be achieved. However, the use of such multiple intake passages provides problems with low speed running. That is, the gas velocity through the increased induction passage area is so slow at low and mid-range speeds that poor performance is encountered. Therefore, it has been proposed to provide some form of throttle valve arrangement for controlling the flow through the intake passages so that less than the maximum effective area is employed at low speed running. Such an arrangement increases the gas velocity at low speeds and can significantly improve low speed running. Examples of such arrangements are shown in Japanese Patent SHO 47-32850, Japanese published utility model application SHO 54-97620, and Japanese laid open patent application SHO 55-551920. It has been found, however, with the previously proposed throttle controlling mechanisms that performance is deteriorated at least certain running conditions. For example, it has been found that the previously proposed throttle controlling arrangements actually result in a reduction in mid-range torque due to the fact that the throttle controlling arrangement restricts air flow under these conditions. It has been found that the throttle valve control is not sufficient to avoid the generation of pulsations in the intake system under this running condition which pulsations reduce charging efficiency and provide a loss in mid-range torque. Furthermore, the previously proposed throttle valve arrangements may actually result in some decreases in low speed torque as well.

It is, therefore, a principal object of this invention to provide an improved induction system for an internal combustion engine.

It is a further objection of the invention to provide an induction system that improves the torque characteristics throughout the entire engine speed and load ranges.

It is another object of this invention to provide an improved throttle valve arrangement for an engine having an induction system consisting of multiple intake passages for each chamber of the engine.

It is yet a further object of this invention to provide a throttle valve arrangement for a multiple intake passage induction system that improves the torque throughout the engine speed and load ranges.

SUMMARY OF THE INVENTION

A first feature of this invention is adapted to be embodied in an induction system for an internal combustion engine having a chamber and first and second intake passages that communicate with the chamber. The intake passages have a common portion upstream of their communication with the chamber and a first manually operated throttle valve is positioned in the common portion of the intake passages. In accordance with this feature of the invention, a second manually operated throttle valve is positioned in the first intake passage between the first manually operated throttle valve and the chamber. Linkage means control the position of the second throttle valve in response to the position of the first manually operated throttle valve so that the second throttle valve is fully opened before the first throttle valve is fully opened. A third throttle valve is positioned in the second intake passage between the first manually operated throttle valve and the chamber. Means are provided for automatically operating the third throttle vlave.

Yet another feature of this invention is adapted to be embodied in an induction system as set forth in the preceding paragraph that comprises first and second intake passages communicating with the same chamber of the engine. In accordance with this feature of the invention, a manually operated throttle valve is positioned in a common portion of the intake passages and an automatically operated throttle valve is positioned in the second of the intake passages between the first throttle valve and the chamber. Means are provided for selectively exerting an induction system pressure on the second throttle valve for opening the second throttle valve in response to the pressure in the induction system under a predetermined condition.

Still a further feature of the invention is adapted to be embodied in an induction system for an internal combustion engine having a pair of intake passages that serve a commom chamber of the engine. In accordance with this feature of the invention, a first manually operated throttle valve is positioned in one of the intake passages, and an automatically operated throttle valve is positioned in the other of the intake passages. The automatically operated throttle valve is not opened until the manually operated throttle valve has reached its fully opened position.

DETAILED DESCRIPTION OF THE PREFERRED EMBODIMENT

Figure 1:
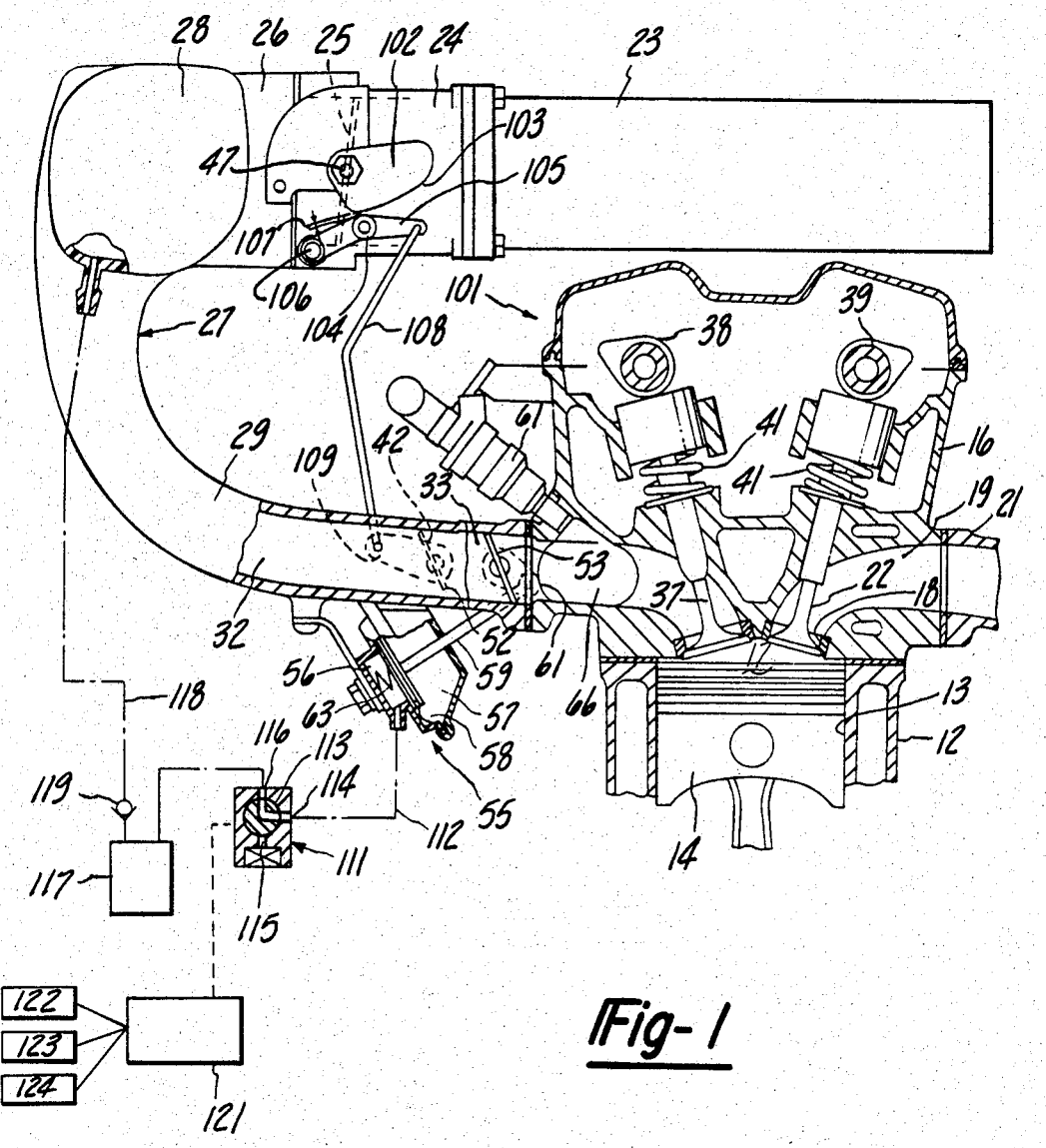
FIG. 1 is a partial side elevational view of an engine constructed in accordance with an embodiment of the invention, with portions shown in section and other portions removed.
Figure 2:
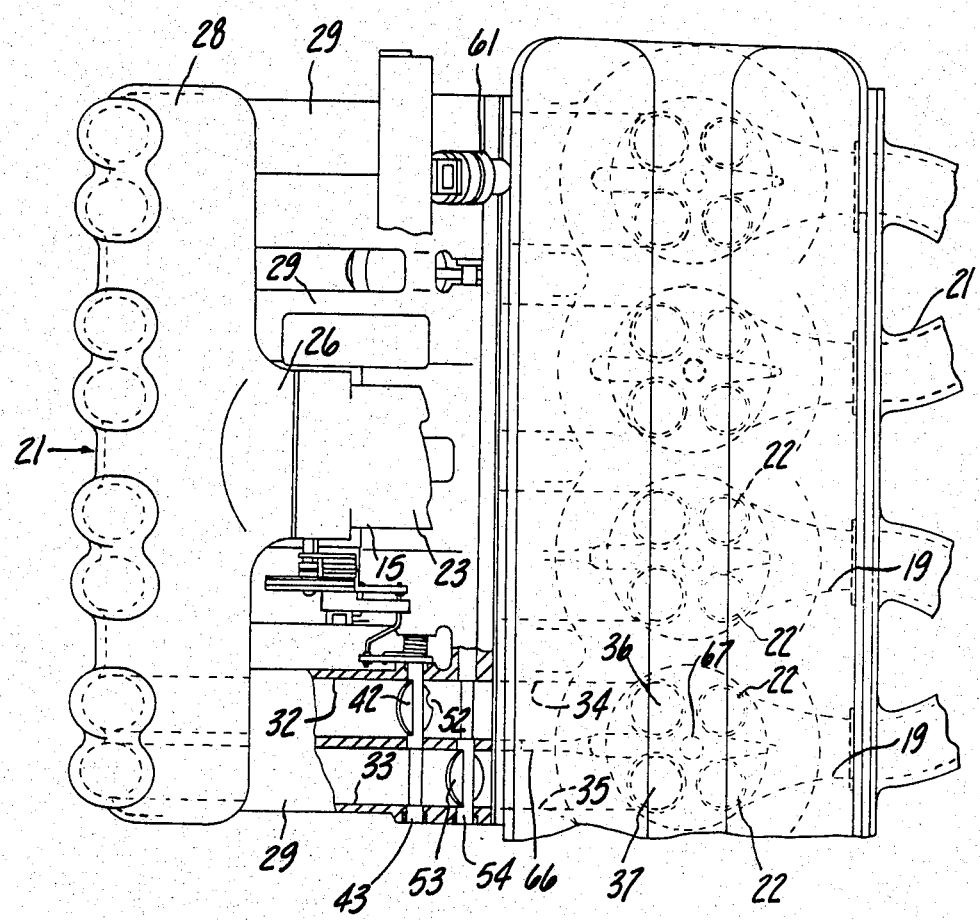
FIG. 2 is a top plan view of the embodiment shown in FIG. 1, with portions broken away.

The reference numeral 101 indicates generally a four-cylinder, in-line, four-cycle reciprocating engine constructed in accordance with a first embodiment of the invention. Although the invention is described in conjunction with an engine of this cylinder number and configuration, it is believed readily apparent to those skilled in the art that the invention is susceptible of use with engine of other types. Furthermore, certain features of the invention are not limited to utility with reciprocating engines.

The engine 101 includes a cylinder block 12 having cylinder bores 13 in which pistons 14 are supported for reciprocation. The pistons 14 are coupled by means of connecting rods 15 to a crankshaft (not shown) for driving the crankshaft in a known manner.

A cylinder head, indicated generally by the reference numeral 16, is affixed in a suitable manner to the cylinder block 12. The cylinder head 16 is formed with recesses 17 that cooperate with each of the cylinder bores 13 and pistons 14 to form the engine chambers. At times the recesses 17 will be referred to as the combustion chambers.

A pair of exhaust ports 18 are formed on one side of the cylinder head 16 and extend from each of the combustion chambers to an exhaust passage 19 which in turn communicates with an exhaust maniford 21. Exhaust valves 22 cooperate with the exhaust ports 18 so as to control the communication between the chamber 17 and the exhaust passages 19.

The engine 101 has an induction system that includes an intake device 23 which may comprise an air cleaner or the like and which communicates with a main throttle valve assembly 24. The main throttle valve assembly 24 comprises a valve body in which a manually operated throttle valve 25 is positioned for controlling the flow into an inlet 26 of an intake manifold, indicated generally by the reference numeral 27. The inlet 26 communicates with a plenum chamber 28 having runners 29 formed for each of the cylinders 13. Each runner 29 is divided by a wall 31 into a primary intake passage 32 and a secondary intake passage 33. The manifold intake passages 32 and 33 communicate respectively with primary and secondary cylinder head intake passages 34 and 35. The cylinder head intake passages 34 and 35 terminate at respective intake ports in which intake valves 36 and 37, respectively, are provided for controlling the flow to the combustion chamber 17.

The intake valves 36 and 37 are operated by an overhead intake cam shaft 38 in a known manner. In a like manner the exhaust valves 22 are operated by an exhaust cam shaft 39, which is also supported in the cylinder head 16. The cam shafts 38 and 39 are driven in a known manner and operate the intake valves 36, 37 and exhaust valves 22 in opposition to the action of the return springs 41, as is well known in this art.

A plurality of second, manually operated throttle valves 42 are provided, each of which is supported in a respective one of the intake manifold primary induction passages 32. The second throttle valves 42 are affixed to respective throttle valve shafts 43 with the throttle valve shafts 43 of each manifold runner 29 being connected together in a suitable manner for simultaneous rotation.

Each of the second manually operated throttle valves 42 is provided with a relief or notch 52 that is sized so as to permit a predetermined degree of air flow, even when the throttle valves 42 are in their fully closed position. The sizing and effectiveness of the notches 52 will be described later.

A control valve 53 is positioned in each of the manifold secondary induction passages 33 for controlling the flow therethrough. The control valves 53 are all connected to a common shaft 54 and are adapted to be opened by means of an actuating device indicated generally by the reference numeral 55, in a manner to be described. The control device 55 consists of an outer housing that is divided into a vacuum chamber 56 and an atmospheric chamber 57 by means of a diaphragm 58. A control rod 59 is affixed to the diaphragm 58 and is pivotally connected at one end to a lever 61 that is affixed to the control valve shaft 54. The atmospheric chamber 57 is continuously exposed to atmospheric pressure by means of the clearance between the housing and the control rod 59. The vacuum chamber 56 is selectively exposed to induction system vacuum or atmospheric pressure in a manner to be described. A spring 63 is positioned in the vacuum chamber 56 for urging the diaphragm 58 to a position wherein the control valves 53 will be opened when the pressure in the atmospheric chamber 57 and vacuum chamber 56 are substantially equal.

A fuel injection nozzle 65 is provided for each of the cylinders 13. Each fuel injection nozzle 65 is supported by the cylinder head 16 and is positioned so as to discharge into an area 66 where the cylinder head intake passage 34 and 35 communicate with each other. The communication area 66 is provided by an opening in a wall 67 of the cylinder head 16 which separates the passages 34 and 35 from each other for at least a portion of their length. The communication area 66 is positioned relatively close to the intake valves 36 and 37.

An actuating cam 102 is fixed for rotation with the main throttle valve shaft 47 and has a cam face 103 that is juxtaposed to a roller follower 104 carried by an arm 105 that is pivotally supported on the valve body 24 by means of a pivot shaft 106. When the engine is in its idle condition, the cam face 103 is spaced from the follower 104 by means distance indicated by the dimension 107 in FIG. 1.

A link 108 is pivotally connected at one of its ends to the lever 105. The opposite end of the link 108 is connected to a lever arm 109 that is fixed to the shaft 43 of the control valves 42. The lost motion afforded by the clearance 107 is such that the control valves 42 will not begin to open until the main throttle valve 25 has been opened to more than a predetermined amount. The clearance afforded by the notch 52 is sufficient so as to permit the flow into the chambers 17 even when the valves 42 are closed, while at the same time introducing a high velocity component to them to improve turbulence and combustion efficiency. At the time the size of the notch 52 is insufficient to permit the required air flow, the throttle valve 25 will have been opened sufficiently for the cam surface 103 to contact the roller follower 104 and pivot the lever 105 to actuate the link 108 to open the control valves 42. The construction is such that the control valves 42 will reach their wide open position when the main throttle valve 25 is approximately one half opened. Thus, the control valves 42 are opened at a more rapid rate than the main throttle valve 25 once opening of the control valves 42 is initiated.

As has been noted, the control valves 53 are operated by the vacuum actuator 55. The vacuum chamber 56 of the vacuum actuator 55 is not continuously exposed to intake manifold vacuum. Rather, a three-way valve, indicated generally by the reference number 111, selectively communicates the vacuum chamber 56 with induction system vacuum or with atmospheric pressure. A conduit 112 extends from the vacuum chamber 56 to the valve 111. The valve 111 has a valve element 113 that communicates with a port 114 that communicates with the conduit 112 and either an atmospheric port 115 or a vacuum port 116. The vacuum port 116 communicates with an accumulator chamber 117 that is evacuated by means of a conduit 118 that leads to the manifold plenum chamber 28 and a one-way check valve 119. As a result of this connection, when the engine 101 is running, the accumulator 117 will be evacuated to a negative pressure which is maintained by the check valve 119.

The position of the valve element 113 is controlled by means of a electronic controller, shown schematically and indicated generally by the reference numeral 121. The controller 121 receives signals indicating air flow rate from a sensor, indicated schematically at 122; engine speed, from a sensor indicated schematically at 123, and vehicle speed, from a sensor indicated schematically at 124. When the controller 121 places the valve element 113 in a position so that the ports 114 and 115 are in communication, the vacuum chamber 56 will be vented to atmosphere and the control valves 53 will be held in a fully opened position by the spring 63. When the valve element 113 is, however, disposed so as to place the port 114 in a communication with the port 116, the vacuum chamber 56 will be evacuated and the control valves 53 will be held in their closed position, as shown in the drawings.

The drawings illustrate the engine and valves as they appear when the engine is idling. The main throttle valve is in its idle position and the throttle valves 42 will also be held in a substantially closed position by a return spring that acts on the lever 105 and on the throttle shaft 43. The idle air flow will, however, be inducted into the chambers 17 at a high velocity due to the provision of the gap 52 in the throttle valves 42. As a result turbulence and swirl will be induced in the chamber 17 of sufficient magnitude to be maintained during the compression stroke and at the time spark plugs 70 in the chamber 17 are fired. As a result of this turbulence there will be extremely rapid flame propagation and good combustion.

During idling the controller 121 places the valve element 113 in a position so that the vacuum chamber 56 communicates with the accumulator 117 and, thus, the diaphragm 58 will be urged against the action of the spring 63 to hold the control valves 53 in their closed position.

As the throttle valve 25 is progressively opened, the cam surface 103 will approach the follower 104 and take up the clearance 107. During this initial opening of the throttle valve 25, the throttle valves 42 are maintained in their closed position. Air flow will still be delivered to the chamber through the gap 52 and the high velocity and turbulence will be maintained as the engine goes off idle. Again, this turbulence will result in the improved combustion as aforenoted.

As the throttle valve 25 is continued to open, the cam surface 103 will contact the roller follower 104 and initiate opening of the throttle valves 42. Thus, an increased air flow can be provided to the chamber 17.

Continued opening of the throttle valve 25 causes accelerated openings of the throttle valves 42 as aforenoted. The linkage and cam and follower arrangement is such that the control valves 42 will be at a fully opened position when the main throttle valve is approximately at its half-opened position. Eventually, a stage will be reached where the restriction of the intake valves 36 is such that pulsations might be induced in the intake system that would reduce charging efficiency. However, this is avoided by means of communication area 66 that permits a portion of the intake charge to be delivered to the chambers 17 through the secondary cylinder head intake passages 35. This is permitted even though the control valves 53 are still maintained in their closed position by the vacuum actuator 55 and operation of the valve 111.

As the main throttle valve 25 is opened passed its half-opened position, the controller 121 will eventually sense a condition wherein opening of the control valves 53 is demanded. When this occurs, the controller 121 will operate the valve element 113 so as to place the port 114 in communication with the atmospheric port 115. In this condition the atmospheric pressure will be exerted in the vacuum chamber 56 and the spring 63 will urge the control valves 53 to their fully opened position.

Figure 3:
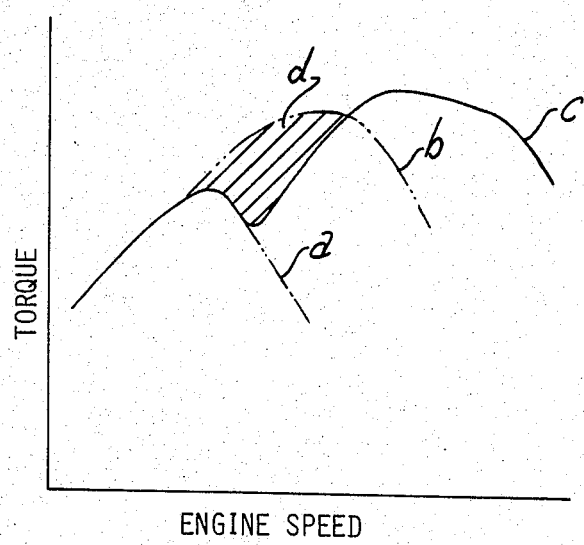
FIG. 3 is a graphical analysis showing the torque curves of the embodiments of the invention.

It is believed apparent to those skilled in the art that the invention provides an arrangement wherein extremely good low speed running may be accomplished while at the same time maximum power achieved. Furthermore, the use of the communication area 66 permits good mid-range torque. These characteristics can be best understood by reference to FIG. 3. In FIG. 3 the torque versus engine speed is plotted for various induction systems. The curve "a" indicates the torque developed by an engine having only a single intake passage serving each chamber, such as the primary manifold passage 32 and cylinder head intake passage 34. It should be noted that the torque falls off as engine speed increases beyond a certain point due to the restriction of the intake system to maximum charging efficiency. The solid line curve "c" indicates the torque of an engine having both primary and secondary intake systems but not communicating passageway. It should be seen that mid-range torque actually decreases due to the restriction of the intake valve 36 under this running condition which has the effect of inducing pulsations in the intake system that reduce charging efficiency. In order to compensate for this problem with previously proposed engines having multiple intake passages serving each chamber, it has been the practice to open the control valves at a fairly early point. The opening of the control valves has the effect of eliminating the restriction in the intake air flow, however, the large effective cross-sectional area causes very low velocities through the intake system in mid-range running and poor combustion results. With this invention, however, the communication area 66 has the effect of providing a curve as shown by the curve "b" which significantly increases the mid-range torque without inducing unduly low air flow velocities. Thus, a torque increase as indicated by the shaded area "d" is achieved through the use of the communication port. Furthermore, because of the use of this port, it is possible to hold the control valves 53 in a closed position during a larger proportion of the engine running. This insures high intake charge velocities that improves the turbulence in the combustion chamber and, accordingly, combustion efficiency and smooth running. At the same time, however, maximum power can be achieved when the control valves 53 are opened due to the significantly increased effective area of the induction system.

The described construction also permits the use of a single throttle valve for controlling the idle air flow that is positioned upstream of the individual runners in a common portion. As a result of this arrangement, charge distribution between the various cylinders at low speed is greatly improved.

In addition to the aforesaid advantages, by providing a curvature or C-shape to the induction system it is possible to locate the main throttle valve 25 above the auxiliary manually operated throttle valves 42 so as to improve compactness of the engine and to simplify the interconnecting linkage.

Although an embodiment of the invention has been disclosed, it is believed to be within the scope of those skilled in the art to use further embodiments of the invention without departing from the spirit and scope thereof, as defined by the appended claims.

We claim:

1. In an induction system for an internal combustion engine comprising a chamber, a first intake passage communicating with said chamber, a second intake passage communicating with said chamber, said intake passages having a common portion upstream of their communication with said chamber, and a first solely manually operated throttle valve in said common portion of said intake passages, the improvement comprising a second manually operated throttle valve in said first intake passage between said first manually operated throttle valve and said chamber, linkage means for opening the position of said second manually operated throttle valve in response to the position of said first manually operated throttle valve, said linkage means being operative to effect full opening of said second manually operated throttle valve prior to full opening of said first manually operated throttle valve, a third throttle valve in said second induction passage between said first throttle valve and said chamber, means for automatically operating said third throttle valve and fuel injection nozzle means for spraying fuel into at least one of said induction passages downstream of said throttle valves.

2. An induction system as set forth in claim 1 wherein the second throttle valve provides an air flow area when the first and second throttle valves are in their idle position.

3. An induction system as set forth in claim 2 wherein the linkage means permits a predetermined degree of opening of the first manually operated throttle valve before the second manually operated throttle valve is opened.

4. An induction system as set forth in any of claims 1 through 3 wherein the second throttle valve is formed with a relief therein for permitting a predetermined flow therepassed when the second throttle valve is in a fully closed position.

5. An induction system as set forth in claim 4 wherein a connection passage extends between the first and second intake passages downstream of the second and third throttle valves.

6. An induction system as set forth in claim 4 wherein the intake passages are provided with a reversely bent portion so that the first throttle valve is juxtaposed to the second throttle valve and the flow past the first throttle valve is in the opposite direction to the flow past the second throttle valve.

7. An induction system as set forth in any of claims 1 through 3 wherein the means for automatically operating the third throttle valve comprises a vacuum motor having a chamber adapted to be selectively communicated with atmospheric pressure for holding the third throttle valve in one of its positions and induction system vacuum for holding the third throttle valve in the other of its positions.

8. An induction system as set forth in claim 7 wherein a connection passage extends between the first and second intake passages downstream of the second and third throttle valves.

9. An induction system as set forth in claim 7 wherein the intake passages are provided with a reversely bent portion so that the fist throttle valve is juxtaposed to the second throttle valve and the flow passed the first throttle valve is in the opposite direction to the flow passed the second throttle valve.

10. In an induction system for an internal combustion engine comprising a chamber, a first intake passage communicating at its downstream end with said chamber through a first intake port, a second intake passage communicating at its downstream end with said chamber through a second intake port independent of said first intake port, said intake passages having a common portion upstream of their communication with said chamber, and a first manually operated throttle valve in said common portion of said intake passages, the improvement comprising a second manually operated throttle valve positioned in said first intake passage for controlling the flow therethrough, said second manually operated throttle valve having a relief formed therein for permitting flow when said second manually operated throttle valve is in its closed position, and linkage means for interrelating said first and said second manually operated throttle valves for opening said second manually operated throttle valve in response to opening of said first manually operated throttle valve, said linkage means including a lost motion connection so that said second manually operated throttle valve is held in its closed position during a predetermined degree of opening of said first manually operated throttle valve said linkage means further being effective to cause said second manually operated throttle valve to reach its fully opened position prior to full opening of said first manually operated throttle valve.

11. An induction system as set forth in claim 10 further including a communicating passage extending between the first and second intake passages downstream of the second manually operated throttle valve.

12. An induction system as set forth in claim 11 wherein the communicating passage is positioned in close proximity to the first and second intake ports.

13. An induction system as set forth in claim 12 further including a third throttle valve in the second intake passage upstream of the communicating passage and means for automatically operating said third throttle valve.

14. An induction system as set forth in any of claims 10 through 13 wherein the intake passages are provided with a reversely bent portion so that the first throttle valve is juxtaposed to the second throttle valve and the flow past the first throttle valve is in the opposite direction to the flow past the second throttle valve.

15. In an induction system for an internal combustion engine comprising a chamber, a first intake passage communicating with said chamber, a second intake passage communicating with said chamber, said intake passages having a common portion upstream of their communication with said chamber, and a first manually operated throttle valve in said common portion of said intake passages, the improvement comprising a second manually operated throttle valve in said first intake passage between said first throttle valve and said chamber, a third throttle valve in said second intake passage between said first throttle valve and said chamber, linkage means for interrelating the opening of said throttle valves so that said first and said second throttle valves are in their fully opened position prior to the opening of said third throttle valve and fuel injection nozzle means for spraying fuel into at least one of said induction passages downstream of said throttle valves.

16. An induction system as set forth in claim 15 wherein the first and second intake passages communicate with the chamber independently of each other through respective first and second intake ports.

17. An induction system as set forth in claim 16 further including a communicating passage extending between the first and second intake passage downstream of the second and third throttle valves.

18. An induction system as set forth in any of claims 15 through 17 wherein the intake passages are provided with a reversely bent portion so that the first throttle valve is juxtaposed to the second throttle valve and the flow passed the first throttle valve is in the opposite direction to the flow passed the second throttle valve.

19. In an induction system for an internal combustion engine comprising a chamber, a first intake passage communicating with said chamber through a first intake port, a second intake passage communicating with said chamber through a second intake port, said intake passages having a common portion upstream of their communication with said chamber, the improvement comprising a first, manually operated throttle valve in said common portion of said intake passages, a second throttle valve in said second intake passage between said first throttle valve and said second intake port, means for automatically operating said second throttle valve in response to an engine running condition comprising a vacuum motor having a chamber adapted to be selectively communicated with atmospheric pressure for holding said second throttle valve in one of its positions and induction system vacuum for holding said second throttle valve in the other of its positions, said means for selectively communicating the vacuum actuator being responsive to vehicle speed, and means communicating said intake passages with each other downstream of said second throttle valve and upstream of said intake ports for flow into said chamber through both of said passages including when said second throttle valve is closed.

20. In an induction system for an internal combustion engine comprising a chamber, a first intake passage communicating with said chamber through a first intake port, a second intake passage communicating with said chamber through a second intake port, said intake passages having a common portion upstream of their communication with said chamber, the improvement comprising a first, manually operated throttle valve in said common portion of said intake passages, a second throttle valve in said second intake passage between said first throttle valve and said second intake port, means for automatically operating said second throttle valve in response to an engine running condition comprising a vacuum motor having a chamber adapted to be selectively communicated with atmospheric pressure for holding said second throttle valve in one of its positions and induction system vacuum for holding said second throttle valve in the other of its positions, said means for selectively communicating the vacuum actuator being responsive to intake air flow, engine speed and vehicle speed, and means communicating said intake passages with each other downstream of said second throttle valve and upstream of said intake ports for flow into said chamber through both of said passages including when said second throttle valve is closed.

* * * * *